(12) United States Patent
Suzuki

(10) Patent No.: US 9,213,662 B2
(45) Date of Patent: Dec. 15, 2015

(54) I/O BUS SYSTEM

(75) Inventor: Jun Suzuki, Tokyo (JP)

(73) Assignee: NEC CORPORATION, Tokyo (JP)

(*) Notice: Subject to any disclaimer, the term of this patent is extended or adjusted under 35 U.S.C. 154(b) by 402 days.

(21) Appl. No.: 13/121,227

(22) PCT Filed: Nov. 4, 2009

(86) PCT No.: PCT/JP2009/068789
§ 371 (c)(1),
(2), (4) Date: Apr. 26, 2011

(87) PCT Pub. No.: WO2010/055791
PCT Pub. Date: May 20, 2010

(65) Prior Publication Data
US 2011/0206051 A1    Aug. 25, 2011

(30) Foreign Application Priority Data
Nov. 13, 2008   (JP) .................................. 2008-290692

(51) Int. Cl.
*H04L 12/28* (2006.01)
*H04L 12/56* (2006.01)
*G06F 13/40* (2006.01)

(52) U.S. Cl.
CPC .......... *G06F 13/4022* (2013.01); *G06F 13/404* (2013.01)

(58) Field of Classification Search
CPC .............. G06F 9/5077; G06F 13/4022; G06F 13/4027; G06F 13/404; G06F 13/1663; G06F 2212/206
USPC ........... 370/389, 392; 710/306, 311, 312, 316
See application file for complete search history.

(56) References Cited

U.S. PATENT DOCUMENTS

| 6,934,763 | B2 * | 8/2005 | Kubota et al. ................. 709/245 |
| 7,877,521 | B2 * | 1/2011 | Suzuki et al. ................... 710/10 |
| 2003/0093604 | A1 * | 5/2003 | Lee ................................ 710/302 |
| 2004/0186942 | A1 * | 9/2004 | Olarig ........................... 710/313 |
| 2005/0044284 | A1 * | 2/2005 | Pescatore ....................... 710/15 |
| 2006/0126612 | A1 * | 6/2006 | Sandy et al. .................. 370/389 |
| 2006/0239287 | A1 * | 10/2006 | Johnsen et al. .............. 370/412 |
| 2006/0242354 | A1 * | 10/2006 | Johnsen et al. .............. 710/316 |
| 2006/0253619 | A1 * | 11/2006 | Torudbakken et al. .......... 710/31 |

(Continued)

FOREIGN PATENT DOCUMENTS

| JP | 2001282701 A | 10/2001 |
| JP | 2007219873 A | 8/2007 |
| WO | WO 2008018485 A1 * | 2/2008 |

OTHER PUBLICATIONS

International Search Report for PCT/JP2009/068789 mailed Feb. 9, 2010.

*Primary Examiner* — Hoang-Chuong Vu

(57) ABSTRACT

A multi-route connection bridge 24 performs swapping of an address described in a header of network packet to allow a downstream PCI express-network bridge 25 to be connected with a plurality of upstream PCI express-network bridges 21. Also, the multi-route connection bridge 24 configures an I/O resource 3 in advance, maps the configured I/O resource 3 to an address space of each host 1, and swaps header data described in an I/O packet encapsulated to the network packet by using mapping data. Thus, the multi-route connection bridge 24 assigns I/O capability of I/O resource 3 to each host 1 in units of functions to allow the I/O resource 3 to be shared simultaneously by the hosts 1.

8 Claims, 9 Drawing Sheets

(56) References Cited

U.S. PATENT DOCUMENTS

| | | | |
|---|---|---|---|
| 2006/0294261 A1* | 12/2006 | Nordstrom et al. | 710/3 |
| 2007/0097949 A1* | 5/2007 | Boyd et al. | 370/351 |
| 2007/0186025 A1* | 8/2007 | Boyd et al. | 710/305 |
| 2009/0141730 A1* | 6/2009 | Long | 370/411 |
| 2010/0180062 A1* | 7/2010 | Hidaka et al. | 710/314 |

* cited by examiner

I/O BUS SYSTEM

This patent application is the National Phase of PCT/JP2009/068789, filed Nov. 4, 2009, which claims a priority on convention based on Japanese Patent Application No. 2008-290692 filed on Nov. 13, 2008, and the disclosure thereof is incorporated herein by reference.

TECHNICAL FIELD

The present invention relates to an I/O bus and more specifically to an I/O bus system, an I/O bus system control method, and a recording medium in which an I/O bus system control program is recorded.

BACKGROUND ART

Many of currently widespread information processing apparatuses are provided with an I/O bus (for example, PCI bus). With increase in speed of data processing in the I/O bus and increase in an amount of data to be handled, a technique of new I/O bus standards is proposed in place of conventional I/O bus standards. For example, as in JP 2007-219873A, a technique of an I/O bus system is known which is designed according to the new I/O bus standards.

FIG. 1 is a block diagram showing a configuration of the I/O bus system described in JP 2007-219873A. This I/O bus system includes hosts 101, a PCI express switch 105, and I/Os 103.

The host 101 includes a CPU 111, a memory 113, and a route complex 112. The route complex 112 connects the CPU 111, the memory 113, and the PCI express switch 105. A use right of the I/O 103 is assigned to any one of the hosts 101. The assignment of the I/O 103 to the host 101 can be changed.

The PCI express switch 105 includes upstream PCI express-network bridges 121, a network switch 122, downstream PCI express-network bridges 125, and a system manager 151. The upstream PCI express-network bridges 121 bridge between a PCI express bus and a network on the side of the host 101. The network switch 122 transfers network packets. The downstream PCI express-network bridges 125 bridge between the network and the PCI express bus on the side of I/O 103. The system manager 151 controls connection between the upstream PCI express-network bridge 121 and the downstream PCI express-network bridge 125, and sets assignment of the I/O 103 to the host 101.

The upstream PCI express-network bridges 121 are connected to a plurality of downstream PCI express-network bridges 125. The upstream PCI express-network bridge 121 receives I/O packets destined to the I/O 103 from the route complex 112, and encapsulates the received I/O packet to a network packet and transfers it to the network switch 122. At this time, the upstream PCI express-network bridge 121 writes as a destination of the encapsulated packet, a network address of the downstream PCI express-network bridge 125 connected to the I/O 103 as a destination of the I/O packet before encapsulation.

Moreover, the upstream PCI express-network bridge 121 receives a network packet obtained by encapsulating an I/O packet destined to the host 101 from the network switch 122. The upstream PCI express-network bridge 121 performs decapsulation of the received network packet and transmits the obtained packet to the route complex 112.

The downstream PCI express-network bridge 125 is connected to one of the upstream PCI express-network bridges 121. The downstream PCI express-network bridge 125 receives from the I/O 103, an I/O packet destined to the host 101 corresponding to the upstream PCI express-network bridge 121 connected to this downstream PCI express-network bridge 125, encapsulates the received I/O packet to a network packet, writes in a destination of the encapsulated packet, a network address of the upstream PCI express-network bridge 121 connected with the host 101 to which the I/O packet is destined, and transfers it to the network switch 122. Moreover, the downstream PCI express-network bridge 125 receives a network packet obtained by encapsulating an I/O packet destined to the I/O 103 from the network switch 122, decapsulates the network packet to obtain the I/O packet, and transmits the I/O packet to the I/O 103.

FIG. 2 is a diagram showing an address space 115-1 of the host 101-1. A case that all the I/O 103-1 to I/O 103-M are assigned to the host 101-1 will be described. The address space 115 of the host 101 includes an ID number space 1151 as a space for ID numbers including a group of three numbers (a bus number, a device number, and a function number); and a physical memory space 1152. The addresses of the I/Os 103 used by the host 101 are mapped into the ID number space 1151 and the physical memory space 1152. Here, the I/O 103-1 to I/O 103-M are respectively mapped into maps 1511-1 to 1511-M for the I/O 103-1 to I/O 103-M in the ID number space 1151-1 and maps 1521-1 to 1521-M for the I/O 103-1 to I/O 103-M in the physical memory space 1152-1.

The conventional I/O bus system having such a configuration operates as follows. The system manager 151 transmits a control packet to the downstream PCI express-network bridge 125 to control to which of the upstream PCI express-network bridges 121 the downstream PCI express-network bridge 125 is connected. The I/O 103 is assigned to the host 101 connected to the upstream PCI express-network bridge 121 connected to the downstream PCI express-network bridge 125.

The upstream PCI express-network bridge 121 and the downstream PCI express-network bridge 125 encapsulate the I/O packet transmitted and received between the host 101 and the I/O 103 assigned to the host 101 into the network packet, and tunnels between the upstream PCI express-network bridge 121 and the downstream PCI express-network bridge 125.

The host 101 recognizes that the upstream PCI express-network bridge 121 is an upstream PCI-PCI bridge inside a standard-based PCI express switch and that the downstream PCI express-network bridge 125 is a downstream PCI-PCI bridge inside the PCI express switch, thereby recognizing that a region between the upstream PCI express-network bridge 25 and the downstream PCI express-network bridge 21 is under the standard-based PCI express switch. Thus, without requiring special software for the host 101, the conventional I/O bus system can freely change the assignment of the I/O 103 to the host 101.

CITATION LIST

[Patent Literature 1]: JP 2007-219873A

SUMMARY OF THE INVENTION

A related I/O bus is designed under assumption that a downstream PCI express-network bridge is connected to one upstream PCI express-network bridge to perform I/O packet tunneling. Moreover, its design is based on assumption that an I/O resource is occupied by one host. Thus, the I/O resource cannot be simultaneously shared by two or more hosts in some cases.

Furthermore, the related I/O bus system may not perform the I/O packet tunneling with the downstream PCI express-network bridge simultaneously connected to two or more upstream PCI express-network bridges.

It is an object of the present invention to provide an I/O bus system in which an I/O resource can be simultaneously shared by two or more hosts.

An I/O bus system is constructed which includes a plurality of upstream PCI express-network bridges respectively connected to a plurality of hosts; a single downstream PCI express-network bridge connected to an I/O resource; and a connection, bridge arranged between the upstream PCI express-network bridges and the downstream PCI express-network bridge and swapping a network address written in a network packet transferred between the plurality of hosts and the I/O resource.

Briefly speaking, an effect provided by a representative invention of the inventions disclosed in this application is that an I/O bus system in which an I/O resource can be simultaneously shared by two or more hosts can be formed.

Moreover, the present invention can form an I/O bus system capable of performing I/O packet tunneling with the downstream PCI express-network bridge simultaneously connected to the two or more upstream PCI express-network bridges.

In other words, the effect of the present invention is that the I/O resource can be simultaneously shared by the two or more hosts. The reason of this is as follows. The single downstream PCI express-network bridge and the plurality of upstream PCI express-network bridges are made connectable to each other by swapping the address written in a header of the network packet obtained by encapsulating the I/O packet. Also, the I/O resource is previously configured, the configured I/O resource is mapped into an address space of each host in units of functions, and header data written in the I/O packet encapsulated into the network packet is swapped by using data, whereby the functions held by the single I/O resource are respectively assigned to the desired hosts.

Moreover, the effect of the present invention is that the I/O packet tunneling can be performed with the downstream PCI express-network bridge simultaneously connected to the two or more upstream PCI express-network bridges.

BRIEF DESCRIPTION OF THE DRAWINGS

The object, effects, and features of the present invention will be more clarified by a description of embodiments in relation to the accompanying drawings.

DESCRIPTION OF EXEMPLARY EMBODIMENTS

Figure 1:
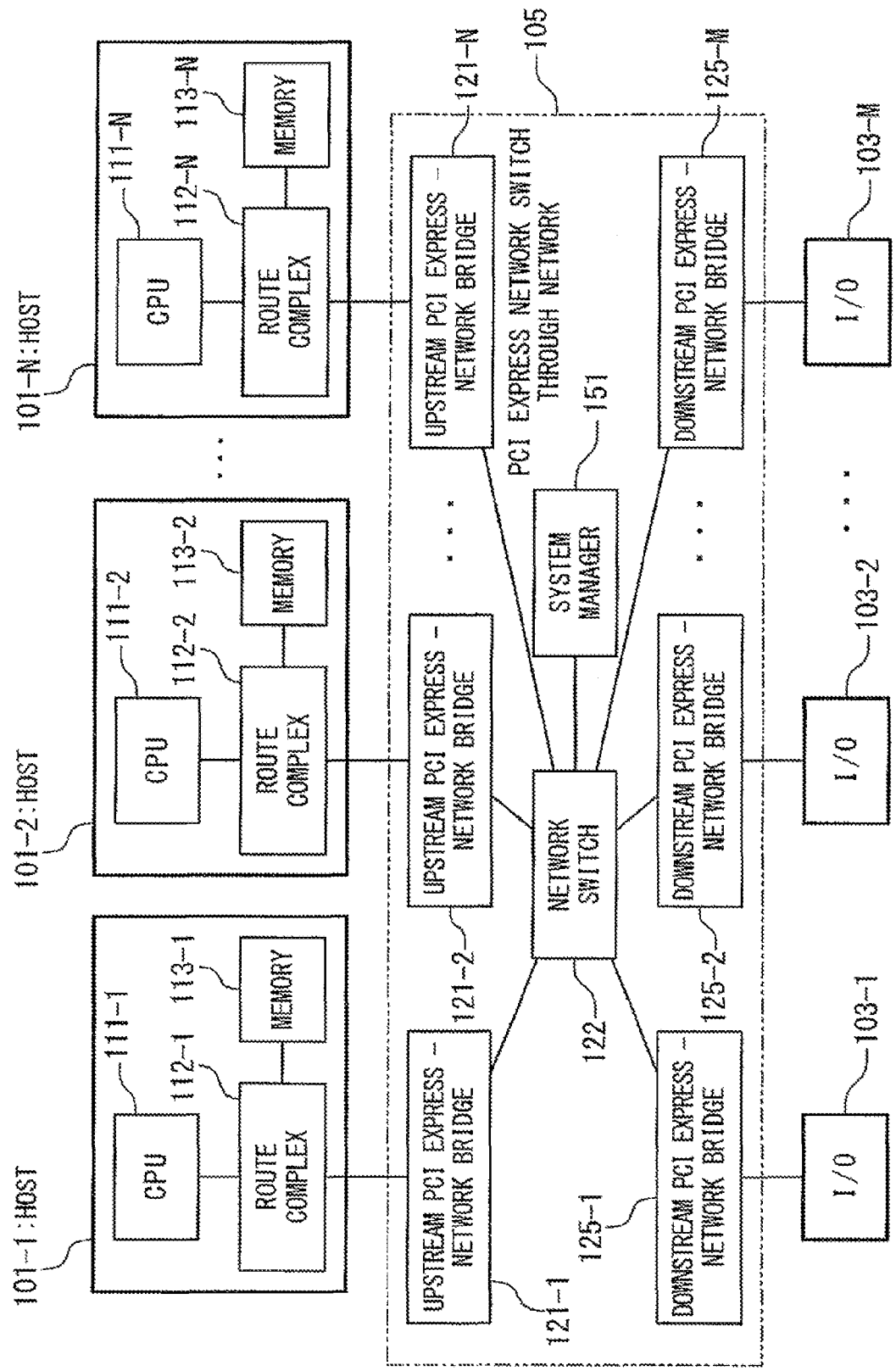
FIG. 1 is a block diagram showing a configuration of a related I/O bus system.
Figure 2:
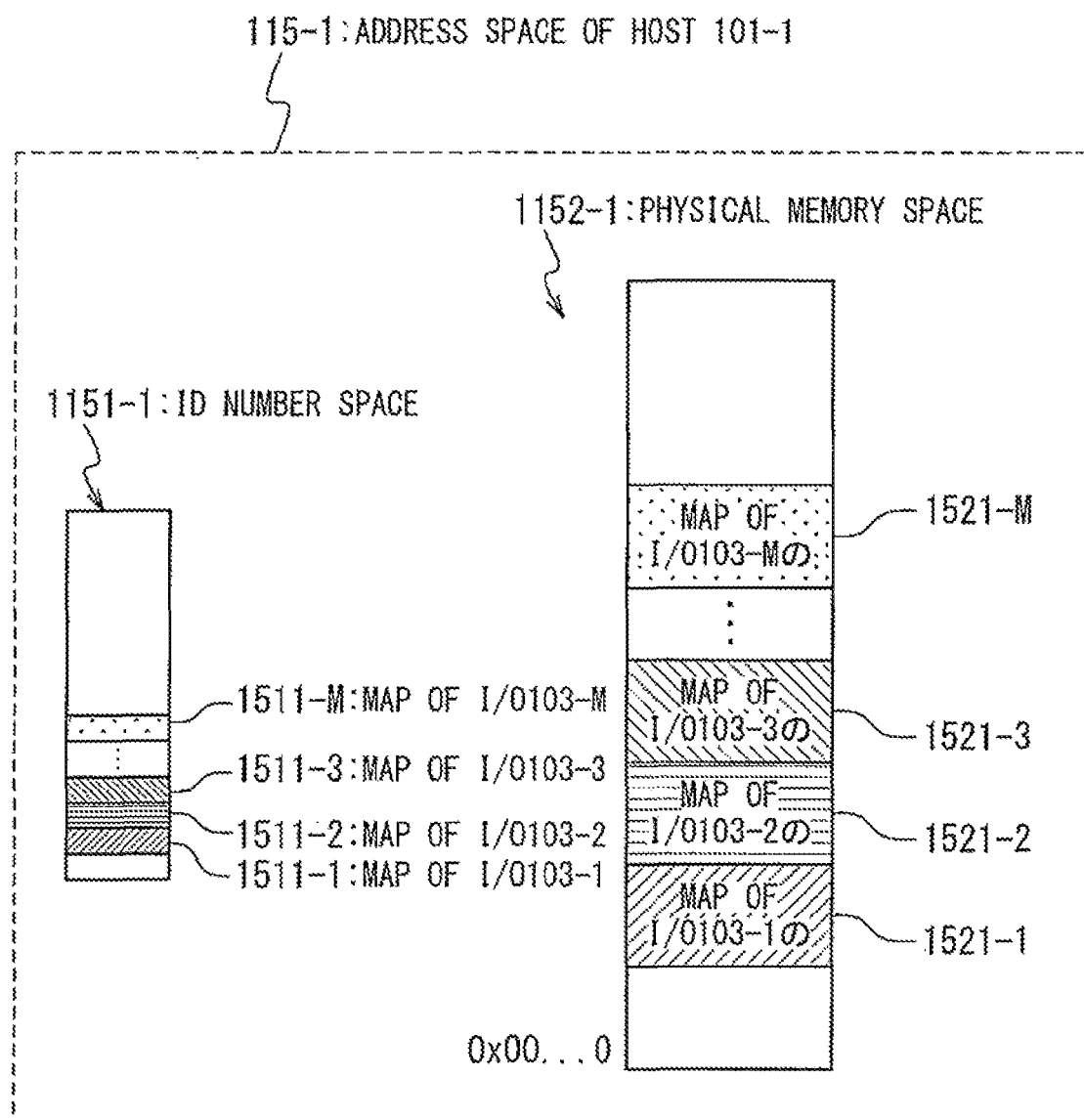
FIG. 2 is a diagram showing an address space of a host.

Hereinafter, the embodiments of the present invention will be described with reference to the attached drawings. It should be noted that same members are assigned with the same numerals, and thus the description thereof will be omitted. Moreover, in the embodiments described below, for example, branch numbers such as "–1" and "–2" are added after the reference numerals, when a plurality of elements provided with the same configuration should be identified.

Figure 3:
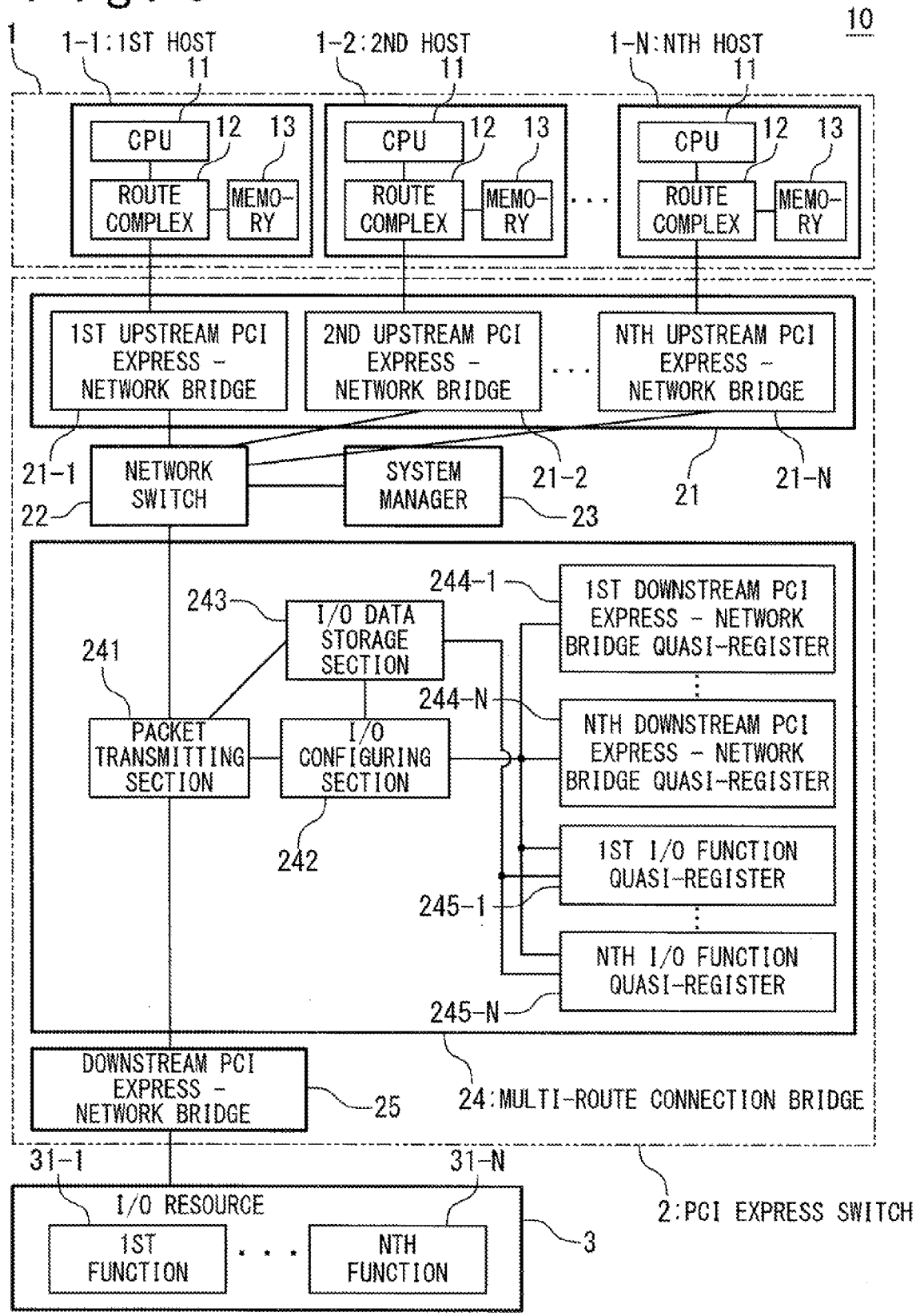
FIG. 3 is a block diagram illustrating a configuration of an I/O bus system according to a first embodiment of the present invention.

Next, a first embodiment of the present invention will be described in detail with reference to the drawings. FIG. 3 is a block diagram illustrating a configuration of an I/O bus system 10 according to a first embodiment of the present invention. The I/O bus system 10 according to the first embodiment of the present invention includes a plurality of hosts 1; a PCI express switch 2; and an I/O resource 3. Each of the plurality of hosts 1 includes a CPU 11, a route complex 12, and a memory 13.

Referring to FIG. 3, the I/O resource 3 includes a plurality of functions 31 (first function 31-1 to the $N^{th}$ function 31-N), which are simultaneously shared by the hosts 1. The I/O resource 3 provides the functions 31 individually to the plurality of hosts 1 to realize the simultaneous sharing of the I/O resource 3 by the plurality of hosts 1. In the present embodiment, the first function 31-1 to the $N^{th}$ function 31-N are respectively assigned to the first host 1-1 to the $N^{th}$ host 1-N, respectively. Here, as examples of the I/O resource 3 holding the plurality of functions 31, a multi-function I/O and an I/O corresponding to software-based virtualization in the single host, i.e., I/O corresponding to I/O virtualization.

The PCI express switch 2 includes: upstream PCI express-network bridges 21 connected to the hosts 1, a network switch 22, a system manager 23, a multi-route connection bridge 24, and a downstream PCI express-network bridge 25. The multi-route connection bridge 24 permits the I/O resource 3 to be simultaneously shared among the plurality of hosts 1 by connecting the downstream PCI express-network bridge 25 to the upstream PCI express-network bridges 21.

One specific upstream PCI express-network bridge 21 operates under assumption that there is no upstream PCI express-network bridges 21 and that the specific upstream PCI express-network bridge 21 is connected to the downstream PCI express-network bridge 25. For example, the upstream PCI express-network bridge 21-1 independently operates without depending on behaviors of the second upstream PCI express-network bridge 21-2 to the $N^{th}$ upstream PCI express-network bridge 21-N.

The downstream PCI express-network bridge 25 can be only connected to one of the upstream PCI express-network bridges 21 in design. Thus, the downstream PCI express-network bridge 25 in the present embodiment is connected with the multi-route connection bridge 24 in place of connection with the upstream PCI express-network bridges 21.

The system manager 23 transmits a control packet to the multi-route connection bridge 24, controls the plurality of upstream PCI express-network bridges 21 connected to the downstream PCI express-network bridge 25, and specifies the hosts 1 to which the respective functions 31 of the I/O resource 3 are assigned.

The multi-route connection bridge 24 includes: a packet transferring section 241, an I/O configuring section 242, an I/O data storage section 243, downstream PCI express-network bridge quasi-registers 244, and I/O function quasi-registers 245.

The packet transferring section 241 swaps a network packet header of a network packet obtained by encapsulating an I/O packet and an I/O packet header and then transfers them. The I/O configuring section 242 configures the I/O resource 3.

The I/O data storage section 243 holds data required upon swapping data described in the packet by the packet transferring section 241. The downstream PCI express-network bridge quasi-register 244 provides a quasi-register capability of the downstream PCI express-network bridge 25. The I/O function quasi-registers 245 provide quasi-register capabilities of the respective functions 31.

The multi-route connection bridge 24 in the present embodiment includes a plurality of downstream PCI express-network bridge quasi-registers 244 (first downstream PCI express-network bridge quasi-register 244-1 to $N^{th}$ downstream PCI express-network bridge quasi-register 244-N). Moreover, the multi-route connection bridge 24 includes a plurality of I/O function quasi-registers 245 (first I/O function quasi-register 245-1 to $N^{th}$ I/O function quasi-register 245-N).

The first downstream PCI express-network bridge quasi-register 244-1 to the $N^{th}$ downstream PCI express-network bridge quasi-register 244-N and the first I/O function quasi-register 245-1 to the $N^{th}$ I/O function quasi-register 245-N accept accesses from the first host 1-1 to the $N^{th}$ host 1-N, respectively.

The I/O configuring section 242 configures the downstream PCI express-network bridge 25 and the I/O resource 3 before the I/O resource 3 is used by the hosts 1. The I/O configuring section 242 transmits a configuration packet encapsulated into the network packet to the downstream PCI express-network bridge 25 and the I/O resource 3, to configure the downstream PCI express-network bridge 25 and the I/O resource 3. A destination of the network packet at this time is set as the downstream PCI express-network bridge 25. Moreover, the I/O configuring section 242 records the configuration data of the downstream PCI express-network bridge 25 and the I/O resource 3 in the I/O data storage section 243.

Figure 4:
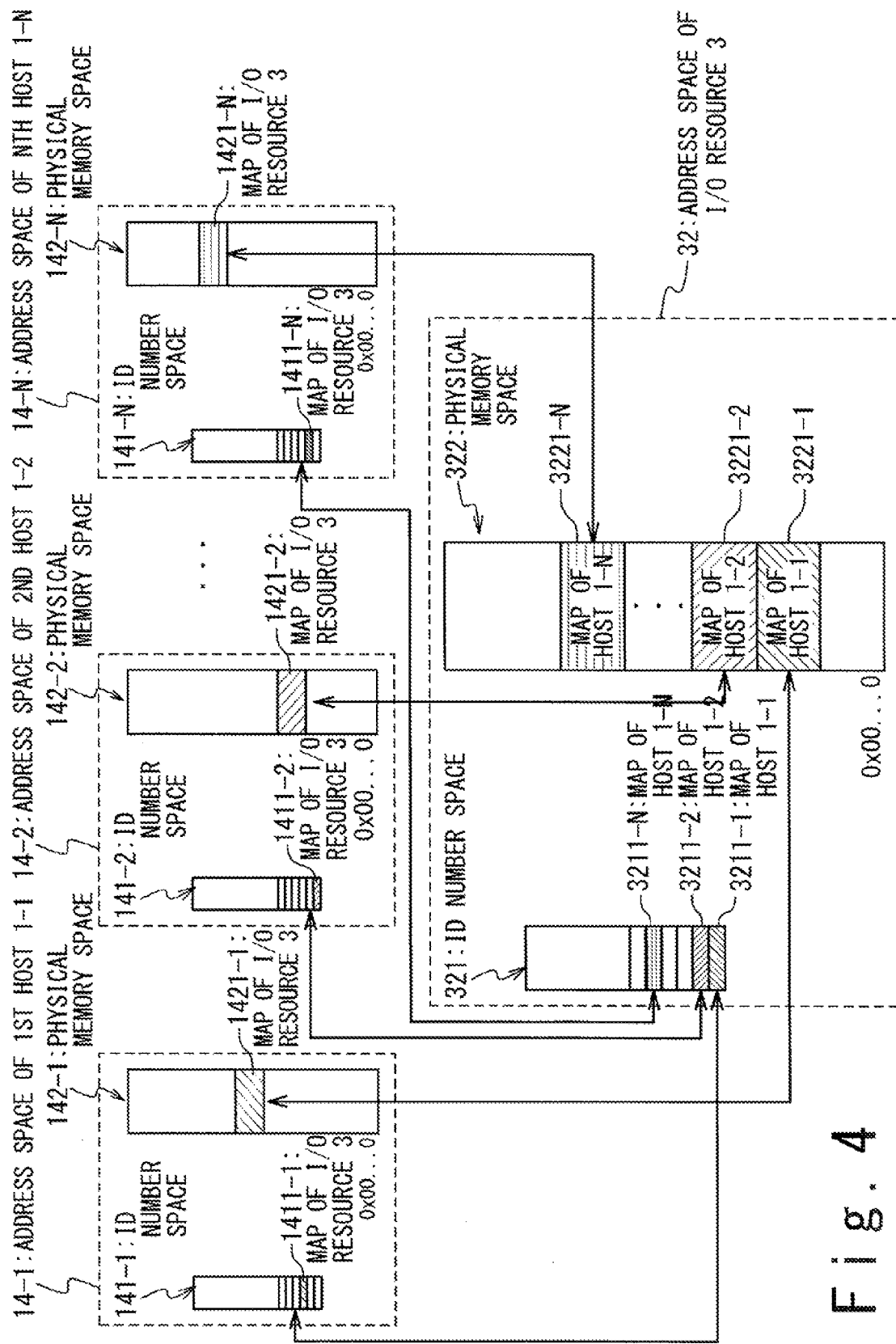
FIG. 4 is a diagram showing a relation between address spaces of hosts 1 and an I/O resource.

FIG. 4 is a diagram showing relationship between address spaces of the hosts 1 and the I/O resource 3. An I/O resource address space 32 of the I/O resource 3 includes an ID number space 321 and a physical memory space 322. The ID number space 321 is a space for ID numbers including a group of "a bus number, a device number, and a function number".

Returning to FIG. 3, the I/O configuring section 242 configures the I/O resource address space 32 of the I/O resource 3. In the ID number space 321, host maps 3211 of the hosts 1 to be assigned to the hosts 1 later are configured, and in the physical memory space 322, host maps 3221 of the hosts 1 are configured. The host map 3211-1 to the host map 3211-N of the hosts 1 and the host map 3221-1 to the host map 3221-N of the hosts 1 correspond to the first function 31-1 to the $N^{th}$ function 31-N of the I/O resource 3.

The I/O configuring section 242 receives the configuration packet transmitted to the downstream PCI express-network bridge 25 and the I/O resource 3 by the host 1 from the packet transferring section 241, and if the configuration packet is write, stores it into the downstream PCI express network bridge quasi-register 244 for the configuration of the downstream PCI express-network bridge 25 and stores it into the I/O function quasi-register 245 for the configuration of the I/O resource 3. If the configuration packet is read, the I/O configuring section 242 reads data required by the packet from a relevant address number of the downstream PCI express-network bridge quasi-register 244 or the I/O function quasi-register 245, and replies it to the host 1 through the packet transferring section 241.

The I/O data storage section 243 holds the configuration data on the configuration of the downstream PCI express-network bridge 25 and the I/O resource 3 and data written into the downstream PCI express-network bridge quasi-register 244 and the I/O function quasi-register 245 by the host 1, and in the network packet obtained by encapsulating the I/O packet, provides data necessary for swapping data written in the headers of the network packet and the I/O packet by the packet transferring section 241. The I/O data storage section 243 holds a target host search table 2431 and a host mapping table 2432.

Figure 5A:
FIG. 5A is a block diagram illustrating a configuration of a target host search table.

Hereinafter, the target host search table 2431 will be described. FIG. 5A is a block diagram illustrating configuration of the target host search table 2431. The target host search table 2431 associates the respective functions 31 of the I/O resource 3 with the hosts 1 to which the respective functions 31 are assigned and network addresses (HA) of the upstream PCI express-network bridges 21 connected to these hosts 1. The first function 31-1 to the $N^{th}$ function 31-N correspond to function numbers $F_{[1]}$ to $F_{[N]}$.

Figure 5B:
FIG. 5B is a block diagram illustrating a configuration of a host mapping table.

Hereinafter, the host mapping table 2432 will be described. FIG. 5B is a block diagram illustrating configuration of the host mapping table 2432. The host mapping table 2432 is prepared individually for each host 1, and associates an ID number provided by the host 1 to its own route complex 12, an ID number provided from the host 1 to the assigned function 31 of the I/O resource 3, memory space lower and upper limits with values obtained by the configuration performed on the I/O resource 3 by the I/O configuring section 242. The host mapping table 2432 denotes a bus number, a device number, and a function number as the ID number by B, D, and F, respectively. FIG. 5B shows mapping relation between a host-side address space 14 of the host 1 held by the host mapping table 2432 and the I/O resource address space 32 of the I/O resource 3. In the I/O resource address space 32 of the I/O resource 3, the ID number space 321 and the physical memory space 322 are mapped on an ID number space 141 and a physical memory space 142 of the host-side address space 14 of the host 1.

Returning to FIG. 3, the downstream PCI express network bridge quasi-registers 244 hold for the every host 1, data provided from the host 1 to the downstream PCI express-network bridge 25 when the configuration is write.

The I/O function quasi-register 245 holds the configuration data provided from the host 1 to the function 31 of the I/O resource 3. Moreover, upon the configuration of the function 31, the host 1 questions about a capacity of the memory space assigned to the function 31, and the I/O function quasi-register 245 provides this data. This data is reflected on the I/O function quasi-register 245 although the acquired data related to the I/O resource 3 is stored into the I/O data storage section 243, when the I/O resource 3 is configured by the I/O configuring section 242.

The packet transferring section 241 receives from the network switch 22, the network packet obtained by encapsulating the I/O packet other than the configuration packet issued to the I/O resource 3 by the host 1, and swaps a transmission source address of the network packet indicating the host 1 to a network address of the multi-route connection bridge 24. Moreover, the packet transferring section 241 searches the host mapping table 2432 corresponding to the host 1 as a transmission source, and swaps a transmission source address of the I/O packet from the ID number of the route complex 12 in the host-side address space 14 of the host 1 to the ID number of the route complex 12 in the I/O resource address space 32 of the I/O resource 3.

Moreover, when a destination address of the I/O packet is expressed by the ID number, the packet transferring section 241 swaps the destination addresses of the I/O packet from the ID number of the function 31 in the host-side address space 14 of the host 1 to the ID number of the function 31 in the I/O resource address space 32 of the I/O resource 3. On the other hand, when the destination address of the I/O packet is expressed by the memory space, the packet transferring section 241 swaps the destination address of the I/O packet to (destination memory−Mem lower limit I×R+Mem lower limit I×I). Symbol x here is a value for the host 1 which is expressed in any of 1-N and which has transmitted the I/O packet.

The packet transferring section 241 also receives from the network switch 22, a network packet obtained by encapsulating the configuration packet transmitted to the downstream PCI express-network bridge 25 and the I/O resource 3 by the host 1, decapsulates the received packet to obtain the configuration packet, and passes it to the I/O configuring section 242. The packet transferring section 241 also receives a network packet obtained by encapsulating the I/O packet transmitted to the host 1 by the I/O resource 3, and swaps a destination address of the network packet from the network address of the multi-route connection bridge 241 to the network address of the upstream PCI express-network bridge 21 connected to the host 1 assigned with the function 31 as a transmission source. The search for the network address of the upstream PCI express-network bridge 21 is performed by using the target host search table 2431 held by the I/O data storage section 243, by using the function 31 as the transmission source described in the I/O packet as a key.

Moreover, the packet transferring section 241 swaps the destination address and the transmission source address of the encapsulated I/O packet, with reference to the host mapping table 2432 corresponding to the host 1 as a destination. The correspondence of the addresses for swapping is opposite to that for swapping performed when the host 1 transmits the I/O packet to the I/O resource 3, and the swapping is performed from the I/O resource address space 32 of the I/O resource 3 to the host-side address space 14 of the host 1. The packet transferring section 241 also receives from the I/O configuring section 242, a response of the configuration packet transmitted to the downstream PCI express network bridge quasi-register 244 and the I/O function quasi-register 245 by the host 1, encapsulates the response packet by using the network address of the upstream PCI express-network bridge 21 connected to the host 1 to which the response packet is destined, and then transmits the encapsulated packet to the host 1. The packet transferring section 241 also receives a broadcast control packet transmitted by the downstream PCI express-network bridge 25, copies the broadcast control packet the number of times corresponding to the number of hosts 1, and transmits them to the respective hosts. At this time, the broadcast control packet transmitted by the downstream PCI express-network bridge 25 includes written data of the multi-route connection bridge 24 as a destination of the connection of the downstream PCI express-network bridge 25, but the packet transferring section 241 rewrites this connection destination data with the upstream PCI express-network bridges respectively connected to the hosts 1 and then transmits the copies of the broadcast control packet.

Figure 6:
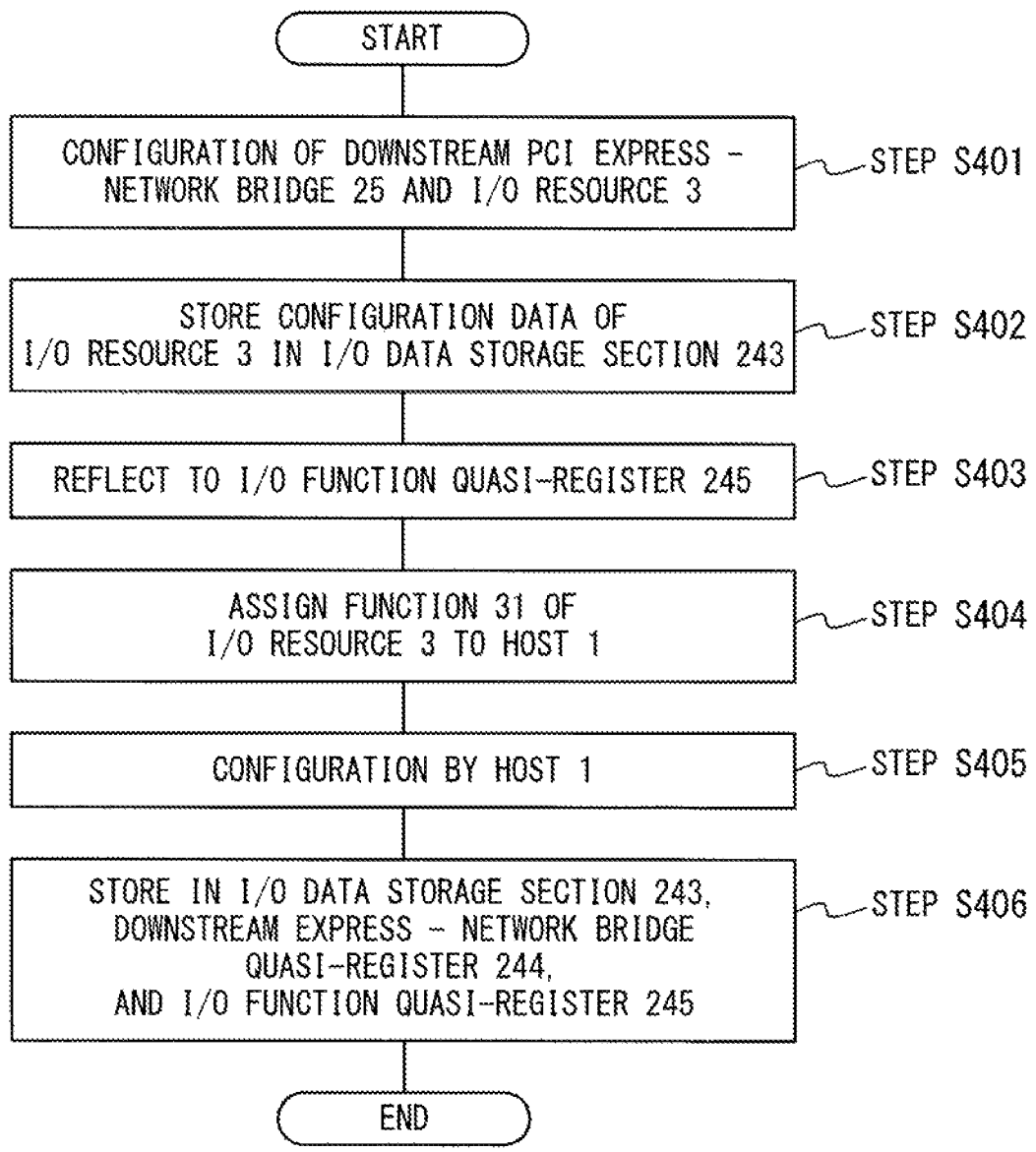
FIG. 6 is a diagram illustrating an operation performed upon configuration of a downstream PCI express-network bridge and the I/O resource.

Hereinafter, an operation of the first embodiment of the present invention will be described. FIG. 6 is a diagram illustrating operation performed upon the configuration of the downstream PCI express-network bridge 25 and the I/O resource 3.

Before the I/O resource 3 is used by the host 1, the I/O configuring section 242 issues a configuration packet and configures the downstream PCI express-network bridge 25 and the I/O resource 3 (step S401). The packet transferring section 241 encapsulates the configuration packet transferred from the I/O configuring section 242 to a network packet, and through tunneling with the downstream PCI express-network bridge 25, transmits the configuration packet to the downstream PCI express-network bridge 25 and the I/O resource 3. The I/O configuring section 242 stores the configuration data given to the I/O resource 3 into the host mapping table 2432 held by the I/O data storage section 243 (step S402). The capacity of the memory space required by each function 31 of the I/O resource 3 is reflected on the I/O function quasi-register 245 although the capacity is stored in the I/O data storage section 243 (step S403).

Next, the system manager 23 issues the control packet to the multi-route connection bridge 24 and assigns the first function 31-1 to the $N^{th}$ function 31-N of the I/O resource 3 to the first host 1-1 to the $N^{th}$ host 1-N, respectively (step S404). Through this assignment, entry concerning the host of the target host search table 2431 held by the I/O data storage section 243 is written.

Next, the hosts 1 start respective configuration cycles (step S405). The I/O configuring section 242 processes as an access to the downstream PCI express network bridge quasi-register 244 assigned to the host 1, the configuration packet issued to the downstream PCI express-network bridge 25 by the host 1, and processes as an access to the I/O function quasi-register 245 corresponding to the function 31, the configuration packet issued to the function 31 included in the I/O resource 3 assigned to the host 1. Moreover, data necessary to write entry of the host mapping table 2432 of the I/O data storage section 243 is extracted from the configuration access of the host, and then the entry is formed (step S406).

Figure 7:
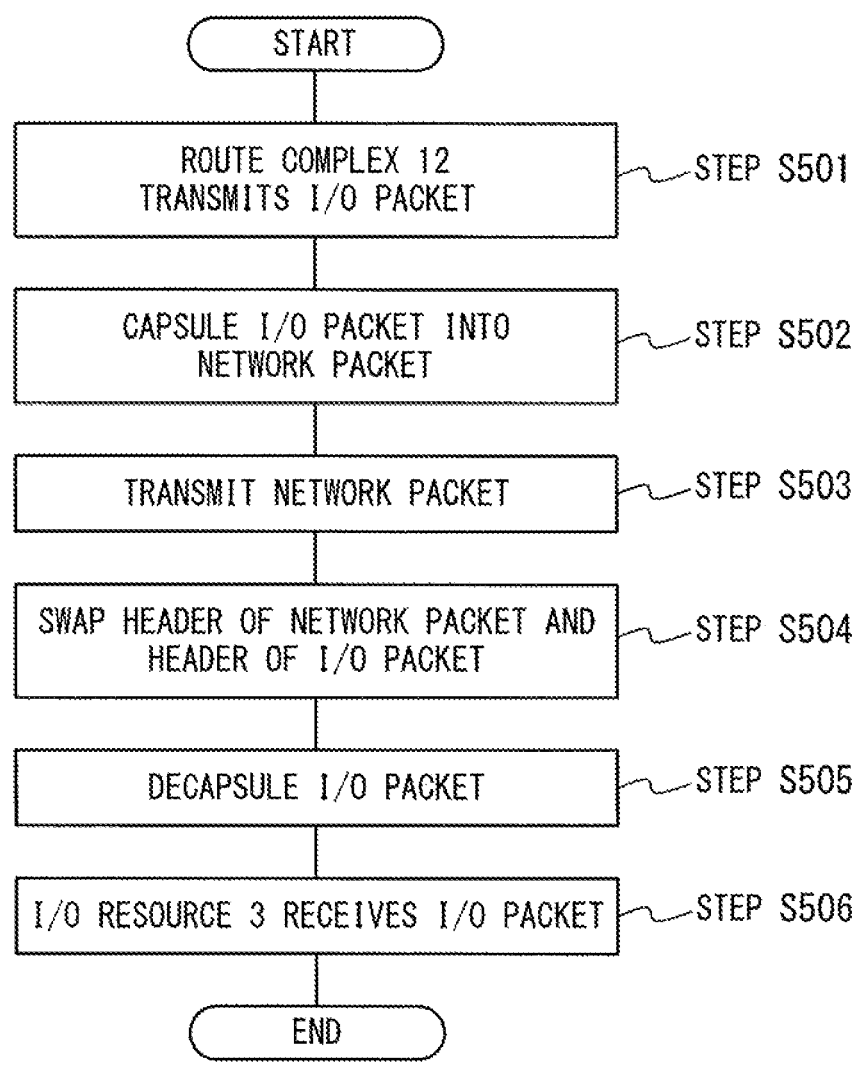
FIG. 7 is a diagram illustrating an operation performed when the host 1 transmits an I/O packet other than a configuration packet to the I/O resource.

FIG. 7 is a diagram illustrating an operation performed when the I/O packet other than the configuration packet is transmitted to the I/O resource 3 by the host 1. In response to a command of software program operating on the CPU 11, the route complex 12, transmits the I/O packet to the function 31 of the I/O resource 3 assigned to the host 1 (S501). The upstream PCI express-network bridge 21 receives the I/O packet issued by the route complex 12, encapsulates the I/O packet by using a network address of the downstream PCI express-network bridge 25 connected to the I/O resource 3, and transmits it to the network switch 22 (step S502). The network switch 22 transfers the network packet obtained by encapsulating the I/O packet to the multi-route connection bridge 24 (step S503).

The packet transferring section 241 receives the network packet obtained by encapsulating the I/O packet, and swaps the transmission source address of the network packet indicating the host 1 to the network address of the multi-route connection bridge 24 (step S504). The packet transferring section 241 also searches the host mapping table 2432 corresponding to the transmission host, and swaps the transmission source address of the I/O packet from the ID number of the route complex 12 in the host-side address space 14 of the host 1 to the ID number of the route complex 12 in the I/O resource address space 32 of the I/O resource 3. Moreover, when the destination address of the I/O packet is expressed by the ID number, the packet transferring section 241 swaps the destination address of the I/O packet from the ID number of the function 31 in the address space of the host 1 to the ID number of the function 31 in the I/O resource address space 32 of the IO resource 3. On the other hand, when the destination address of the I/O packet is expressed by the memory space, the packet transferring section 241 swaps the destination address of the I/O packet to (destination memory−Mem lower limit I×R+Mem lower limit I×I). Symbol x here is a value for the host 1 which is expressed in any of 1-N and which has transmitted the I/O packet. Next, the packet transferring section 241 transmits the network packet to the downstream PCI express-network bridge 25.

The downstream PCI express-network bridge 25 decapsulates the received packet to obtain the I/O packet (step S505), and transmits the I/O packet to the I/O resource 3. The function 31 of the I/O resource 3 receives the I/O packet transmitted by the host 1 assigned with the function 31.

Figure 8:
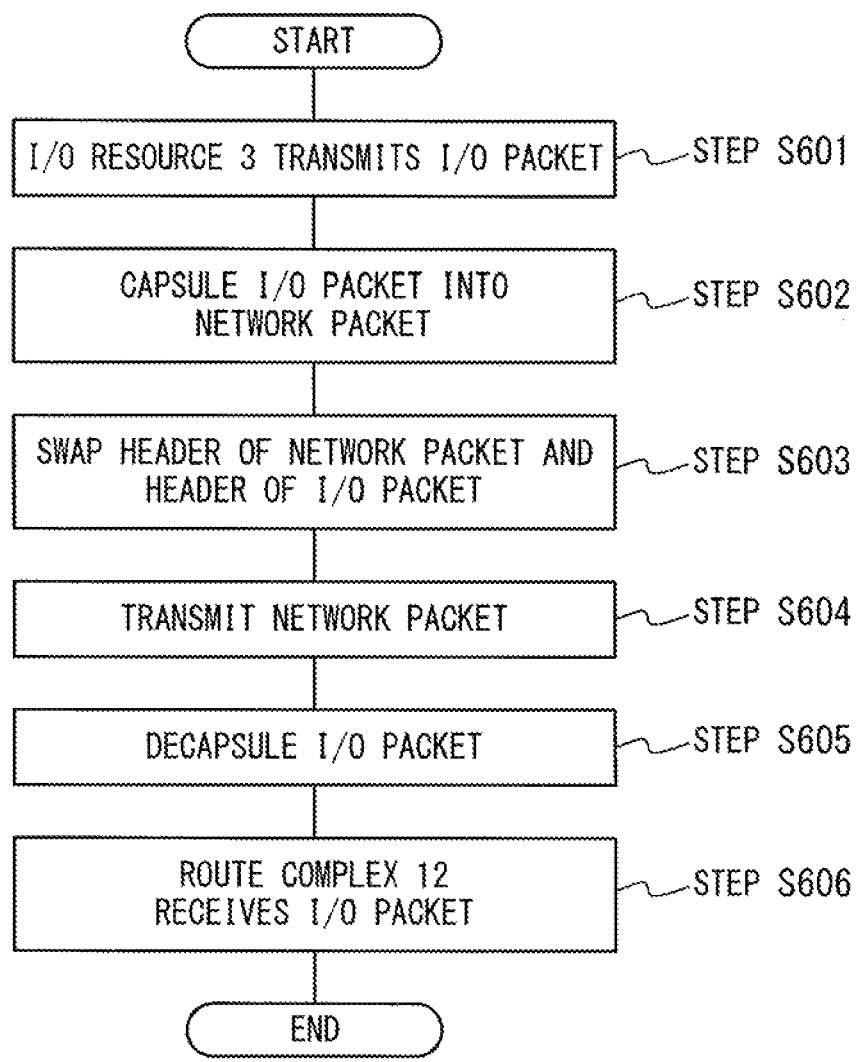
FIG. 8 is a diagram illustrating an operation performed when the I/O packet is transmitted from the I/O resource to the host.

FIG. 8 is a diagram illustrating operation performed when the I/O packet is transmitted from the I/O resource 3 to the host 1. The function 31 of the I/O resource 3 transmits the I/O packet to the host 1 assigned with this function 31 (step S601). The downstream PCI express-network bridge 25 receives the I/O packet issued by the function 31, encapsulates the I/O packet by using the network address of the multi-route connection bridge 24 as a destination address, and transmits it to the multi-route connection bridge 24 (step S602).

The packet transferring section 241 receives the network packet obtained by encapsulating the I/O packet, and swaps a destination address of the network packet indicating the multi-route connection bridge 24 to a network address of the host 1 as a destination of the I/O packet (step S603). The network address of the host 1 as the destination of the I/O packet is searched in the target host search table 2431 by using as a key a transmission source function number written in the I/O packet encapsulated to the network packet. The packet transferring section 241 also searches the host mapping table 2432 corresponding to the destination host, and swaps the transmission source address of the I/O packet from the ID number of the function 31 in the I/O resource address space 32 of the I/O resource 3 to the ID number of the function 31 in the host-side address space 14 of the host 1. Moreover, when the destination address of the I/O packet is expressed by the ID number, the packet transferring section 241 swaps the destination address of the I/O packet from the ID number of the route complex 12 in the I/O resource address space 32 of the I/O resource 3 to the ID number of the route complex 12 in the host-side address space 14 of the host 1. On the other hand, when the destination address of the I/O packet is expressed by the memory space, the packet transferring section 241 swaps the destination address of the I/O packet to (destination memory−Mem lower limit I×I+Mem lower limit I×R). Symbol x here is a value for the host 1 which is expressed in any of 1-N and to which the I/O packet is destined. Next, the packet transferring section 241 transmits the network packet to the network switch 22.

The network switch 22 transfers the network packet obtained by encapsulating the I/O packet, to the upstream PCI express-network bridge 21 (step S604).

The upstream PCI express-network bridge 21 decapsulates the received packet to obtain the I/O packet (step S605) and transmits the I/O packet to the route complex 12. The route complex 12 receives the I/O packet issued by the function 31 assigned to the host 1 (step S606).

The present embodiment described here refers to a case where there is one network switch 22, but there is no limit on the number of network switches 22 connected between the upstream PCI express-network bridges 21 and the multi-route connection bridge 24. Moreover, another network switch 22 may be connected between the multi-route connection bridge 24 and the downstream PCI express-network bridge 25.

Moreover, the present embodiment described here refers to a case where there is one I/O resource 3, but there is no limit on the number of I/O resources 3 simultaneously shared by the plurality of hosts 1. The plurality of I/O resources 3 may be connected by using the network switch 22.

Moreover, the present embodiment described here refers to a case where the first function 31-1 to the $N^{th}$ function 31-N of the I/O resource are respectively assigned to the first host 1-1 to the $N^{th}$ host 1-N, but the functions 31 and the hosts 1 may be freely combined together. Moreover, there may be a host 1 assigned with a plurality of functions 31 and a host 1 not assigned with the function 31. The number of functions 31 held by the I/O resource 3 may be different from the number of hosts 1.

As described above, in the first embodiment, the multi-route connection bridge connects the downstream PCI express-network bridge, originally connected to one upstream PCI express-network bridge, to a plurality of upstream PCI express-network bridges, and assigns I/O resource capability to each host in units of function.

Thus, the multi-route connection bridge provides a quasi-state that all the network packets transmitted by the respective hosts are transmitted from the multi-route connection bridge, and also swaps the destination address of the network packet transmitted by the downstream PCI express-network bridge from the multi-route connection bridge to the network addresses of the respective hosts. On the other hand, the multi-route connection bridge previously configures the I/O resource and maps configuration data to the configuration given to the I/O resource by each host. Then, the multi-route connection bridge swaps, by using the mapping data, data written in the header of the I/O packet transmitted between the host and I/O. Consequently, the I/O capability is assigned to each host in units of functions, so that the I/O resource can be simultaneously shared by the plurality of hosts.

Figure 9:
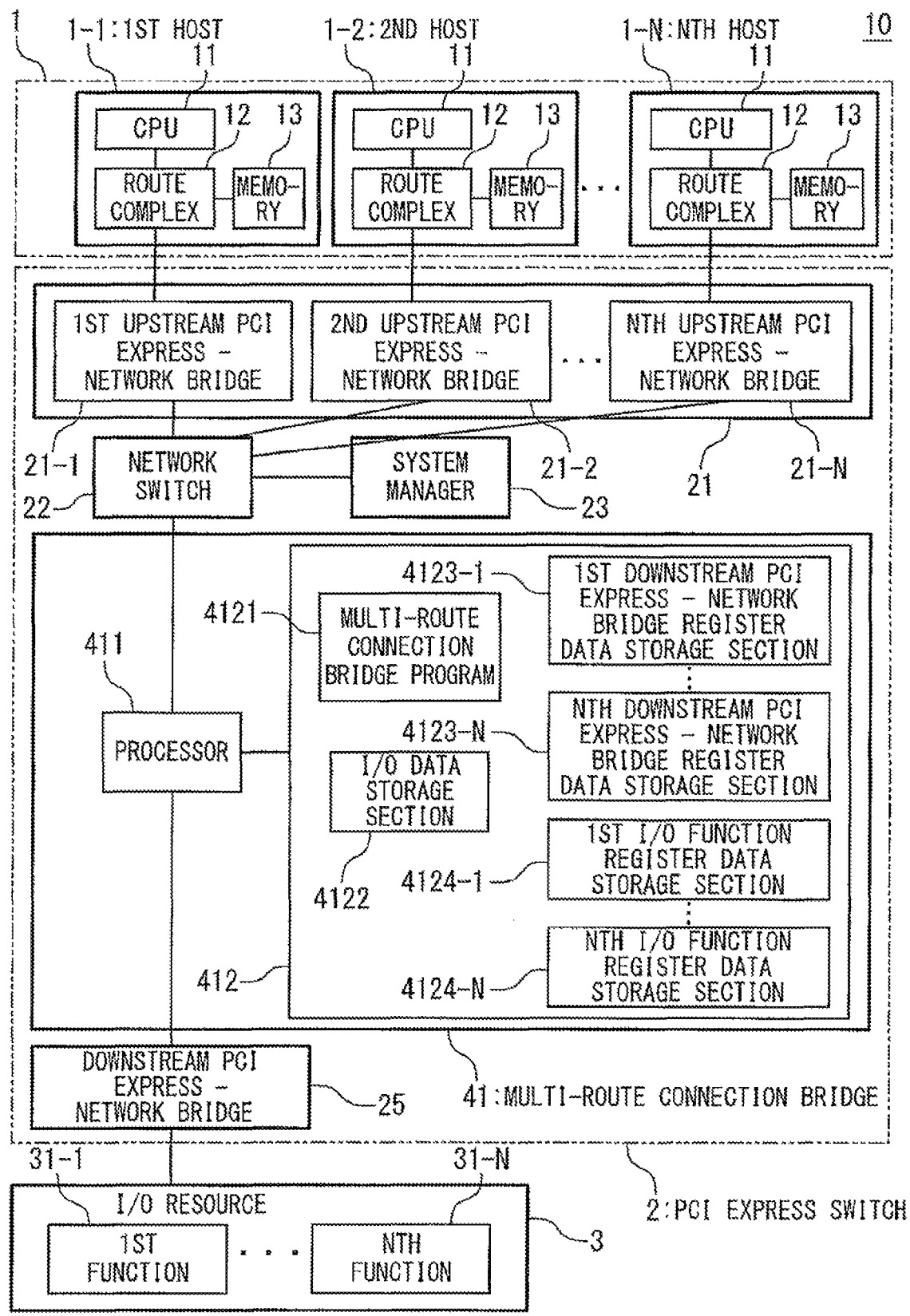
FIG. 9 is a block diagram showing a configuration of an I/O bus system according to a second embodiment of the present invention.

Next, a second embodiment of the present invention will be described with reference to the drawings. FIG. 9 is a block diagram showing configuration of the second embodiment of the present invention. Referring to FIG. 9, the I/O bus system 10 according to the second embodiment of the present invention is different in a point that the PCI express switch 2 in the first embodiment shown in FIG. 3 includes a multi-route connection bridge 41.

The multi-route connection bridge 41 in the second embodiment includes: a processor 411 performing processing on a network packet obtained by encapsulating an I/O packet; and a memory 412 holding a program for the packet processing and configuration data of the I/O bus system 10.

The memory 412 includes: a multi-route connection bridge program 4121 that make the processor 411 perform functions of the packet transferring section 241 and the I/O configuring section 242 in the first embodiment; an I/O data storage section 4122 that holds the same data as that of the I/O data storage section 243; downstream PCI express-network bridge register data storage sections 4123 that hold the same data as that of the downstream PCI express-network bridge quasi-registers 244; and I/O function register data storage sections 4124 that hold the same data as that of the I/O function quasi-registers 245.

The multi-route connection bridge program 4121 is read by the processor 411, and makes the processor 411 perform the functions of the packet transferring section 241 and the I/O configuring section 242 in the first embodiment. At this time, access to the I/O data storage section 243, the downstream PCI express network bridge quasi-registers 244, and the I/O function quasi-registers 245 in the first embodiment occurs to a corresponding address in the I/O data storage section 4122, the downstream PCI express-network bridge register data storage sections 4123, and the I/O function register data storage sections 4124 held by the memory 412.

In the second embodiment of the present invention, by using the program held by the memory, the processor is made to perform the same functions as those of the multi-route connection bridge in the first embodiment. Consequently, without developing special hardware, the designed program can be operated on a general-purpose processor, to achieve simultaneous I/O sharing by the plurality of hosts.

The embodiments of the present invention have been described in detail above. The present invention is not limited to the embodiments described above, and various modifications can be made without departing from the spirits of the present invention. Moreover, the present invention can be applied to I/O device sharing between a plurality of computers or data processors including CPUs, in a computer device, a network device, an industrial device, or a consumer device.

The I/O bus system described above has a feature in that the network address described in the network packet is swapped and the single downstream PCI express-network bridge is connected with the plurality of upstream PCI express-network bridges.

In other words, the I/O bus system described above is characterized by swapping the transmission source address of the network packet transmitted by the upstream PCI express-network bridge to the network address of the bridge relaying the connection and then transmitting it to the downstream PCI express-network bridge, and swapping the transmission source address of the network packet transmitted by this downstream PCI express-network bridge from the network address of the bridge relaying the connection to the network address of this upstream PCI express-network bridge and then transmitting it to this upstream PCI express-network bridge.

Moreover, the I/O bus system is characterized by previously configuring the I/O resource and mapping the I/O resource to the configuration performed by the hosts in units of functions.

The I/O bus system is characterized by previously configuring the I/O resource, storing the configuration data given to the I/O resource by the host, storing the mapping data of the configuration data of the I/O resource and the configuration data given to this I/O resource by the host, and with reference to the stored mapping data, swapping the address described in the header of the I/O packet transmitted and received between the host and the I/O resource.

Moreover, the I/O bus system control program indicating procedures for operating the I/O bus system described above can be stored in a predetermined recording medium. In this case, the I/O bus system control program recording medium storing the I/O bus system control program stores an I/O bus system control program indicating procedures for realizing operation including steps of: connecting the plurality of upstream PCI express-network bridges with the plurality of hosts respectively; connecting the single downstream PCI express-network bridge to the I/O resource; and swapping, between the upstream PCI express-network bridges and the downstream PCI express-network bridge, the network address written in the network packet transferred between the plurality of hosts and the I/O resource.

The I/O bus system control program recording medium stores an I/O bus system control program characterized in that the step of swapping includes steps of: swapping the transmission source address of the network packet transmitted by the upstream PCI express-network bridge to the network address of the bridge relaying the connection and then transmitting it to the downstream PCI express-network bridge; and swapping the transmission destination address of the network packet transmitted by this downstream PCI express-network bridge from the network address of the bridge relaying the connection to the network address of this upstream PCI express-network bridge and then transmitting it to this upstream PCI express-network bridge.

The I/O bus system control program recording medium further stores an I/O bus system control program indicating procedures for realizing operation including a step of previously configuring the I/O resource and mapping the I/O resource for the configuration performed by the host in units of functions.

The I/O bus system control recording medium stores an I/O bus system control program, wherein the mapping process includes steps of: previously configuring the I/O resource; storing the configuration data given to the I/O resource by the host; and storing the mapping data of the configuration data of the I/O resource and the configuration data given to the I/O resource by the host; and the swapping step includes a step of swapping, with reference to the stored mapping data, the address described in the header of the I/O packet transmitted and received between the host and the I/O resource.

The I/O bus system control program recording medium stores an I/O bus system control program indicating procedures for realizing operation including a step of storing the host assigned with the function of the I/O resource. Here, the I/O bus system control program recording medium stores an I/O bus system control program characterized in that the configuring step previously configures the I/O resource and the downstream PCI express network bridge and the swapping step includes a step of swapping, with reference to the stored data related to the host assigned with the function of the I/O resource, the network address of the network packet obtained by encapsulating the I/O packet and swapping, with reference to the stored mapping data of the configuration data, the address of the I/O packet encapsulated to the network packet.

The I/O bus system control program recording medium stores an I/O bus system control program characterized in that the network address swapping is swapping the transmission source address of the network packet transmitted by the upstream PCI express-network bridge to the network address of the bridge relaying the connection and swapping the transmission source address of the network packet transmitted by the downstream PCI express-network bridge from the network address of the bridge relaying the connection to the network address of the upstream PCI express-network bridge.

The I/O bus system control program recording medium stores an I/O bus system control program indicating procedures for realizing operation including a step of causing the processor to perform processing of changing, by the control packet, the capability of the I/O resource assigned to the host.

The I/O bus system control program recording medium stores an I/O bus system control program characterized in that the swapping of the address of the I/O packet is targeted on the memory space and the ID number described in the I/O packet.

Those skilled in the art can easily make various modifications to the embodiments described above. Therefore, the invention is not limited to the embodiments described above, and can be interpreted in a widest range provided by claims and the like.

The invention claimed is:

1. An I/O bus system comprising:
   upstream PCI express-network bridges connected with a plurality of hosts, respectively;
   a single downstream PCI express-network bridge connected an I/O resource; and
   a connection bridge arranged between said upstream PCI express-network bridges and said downstream PCI express-network bridge, and configured to swap a network address written in a network packet transmitted between each of said plurality of hosts and said I/O resource,
   wherein said connection bridge configures said I/O resource before said I/O resource is assigned to a host and before said I/O resource is used by the host by:
   storing configuration data given to said I/O resource by said host in a configuration data storage section;
   storing mapping data of I/O configuration data of said I/O resource and the configuration data given to said I/O resource by said host;
   swapping an address written in a header of an I/O packet transmitted and received between said I/O resource and said host by referring to the mapping data;
   swapping a transmission source address of a network packet transmitted from one of said upstream PCI express-network bridges to a network address of a bridge relaying a connection to transmit to said downstream PCI express-network bridge, and
   swapping a transmission destination address of a network packet transmitted by said downstream PCI express-network bridge from the network address of the bridge relaying the connection to a network address of an upstream PCI express-network bridge to transmit to said upstream PCI express-network bridge;
   previously configuring said I/O resource to have functions, and mapping said I/O resource to configuration by said host in units of said functions; and
   a function assignment storage section configured to store data indicating said host to which one of functions of said I/O resource is assigned,
   wherein one of said upstream PCI express-network bridges connects said host with a network, wherein said downstream PCI express-network bridge connects said I/O resource with said network,
   wherein said connection bridge configures said I/O resource and said downstream PCI express-network bridge previously, and
   wherein said connection bridge:
   refers to said function assignment storage section and swaps the network address of the network packet obtained by encapsulating the I/O packet transmitted between said host and said I/O resource, and
   refers to the mapping data of the I/O configuration data of said I/O resource and the configuration data given to said I/O resource by said host and swaps the address of the I/O packet encapsulated in the network packet.

2. The I/O bus system according to claim 1, wherein said connection bridge:
   swaps the transmission source address of the network packet transmitted by said upstream PCI express-network bridge to a network address of said connection bridge, and
   swaps the transmission destination address of the network packet transmitted by said downstream PCI express-network bridge from the network address of said connection bridge to a network address of said upstream PCI express-network bridge.

3. The I/O bus system according to claim 2, wherein the function of said I/O resource to be assigned to said host is changeable by a control packet.

4. The I/O bus system according to claim 3, wherein the swapping of the address of the I/O packet is performed on a memory space and an ID number written in the I/O packet.

5. A I/O bus system control method comprising:
   connecting a host with a network by using an upstream PCI express-network bridge;
   connecting an I/O resource with said network by using a downstream PCI express-network bridge;
   before said I/O resource is used by said host, configuring said I/O resource and said downstream PCI express-network bridge;
   storing configuration data given to said I/O resource by said host;
   storing data indicating said host to which one of functions of said I/O resource is assigned;
   storing mapping data of I/O configuration data of said I/O resource and the configuration data given to said I/O resource by said host;
   swapping a network address of a network packet obtained through encapsulating an I/O packet by referring to the data indicating said host to which the function of the I/O resource is assigned; and
   swapping an address of the I/O packet encapsulated into the network packet by referring to the mapping data.

6. The I/O bus system control method according to claim 5, wherein said swapping a network address comprises:
   swapping a transmission source address of a network packet transmitted by said upstream PCI express-network bridge to a network address of a bridge for relaying a connection;
   swapping a transmission destination address of a network packet transmitted by said downstream PCI express-network bridge from the network address of said bridge for relaying the connection to a network address of said upstream PCI express-network bridge.

7. The I/O bus system control method according to claim 6, further comprising:
   changing the function of said I/O resource to be assigned to said host with a control packet.

8. The I/O bus system control method according to claim 7, wherein said swapping an address of the I/O packet is performed based on a memory and an ID number.

* * * * *